United States Patent [19]
Tamai et al.

[11] Patent Number: 5,949,178
[45] Date of Patent: *Sep. 7, 1999

[54] VIBRATION WAVE DRIVING APPARATUS AND A VIBRATION MEMBER, AND MANUFACTURING METHOD OF THE APPARATUS AND THE MEMBER

[75] Inventors: Jun Tamai; Ichiro Okumura, both of Yokohama; Takayuki Tsukimoto, Fujisawa; Kazuki Fujimoto, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/635,615

[22] Filed: Apr. 22, 1996

[30] Foreign Application Priority Data

Apr. 26, 1995 [JP] Japan .................. 7-102376
Apr. 26, 1995 [JP] Japan .................. 7-102380

[51] Int. Cl.⁶ .................................. H01L 41/08
[52] U.S. Cl. .................................. 310/323
[58] Field of Search ....................... 310/323, 328

[56] References Cited

U.S. PATENT DOCUMENTS

| | | | |
|---|---|---|---|
| 4,580,073 | 4/1986 | Okumura et al. | 310/323 |
| 4,587,452 | 5/1986 | Okumura et al. | 310/323 |
| 4,678,956 | 7/1987 | Izukawa et al. | 310/323 |
| 4,692,650 | 9/1987 | Okumura et al. | 310/323 |
| 4,692,651 | 9/1987 | Hiramatsu et al. | 310/323 |
| 4,734,610 | 3/1988 | Okumura et al. | 310/323 |
| 4,752,711 | 6/1988 | Tsukimoto et al. | 310/323 |
| 4,771,203 | 9/1988 | Mukohjima et al. | 310/323 |
| 4,788,468 | 11/1988 | Izukawa et al. | 310/323 |
| 4,831,305 | 5/1989 | Mukohjima et al. | 310/323 |
| 5,004,964 | 4/1991 | Kataoka et al. | 318/128 |
| 5,017,823 | 5/1991 | Okumura | 310/323 |
| 5,041,750 | 8/1991 | Kitani | 310/323 |
| 5,055,732 | 10/1991 | Umemura | 310/323 |
| 5,099,166 | 3/1992 | Hirano et al. | 310/323 |
| 5,124,611 | 6/1992 | Tamai et al. | 310/317 |
| 5,134,333 | 7/1992 | Atsuta | 310/323 |
| 5,172,023 | 12/1992 | Kawai et al. | 310/323 |
| 5,233,257 | 8/1993 | Luthier et al. | 310/323 |
| 5,298,829 | 3/1994 | Tsukimoto et al. | 310/323 |
| 5,300,850 | 4/1994 | Okumura et al. | 310/323 |
| 5,347,192 | 9/1994 | Mukohjima et al. | 310/323 |
| 5,363,006 | 11/1994 | Yano et al. | 310/323 |
| 5,418,417 | 5/1995 | Luthier et al. | 310/323 |
| 5,432,394 | 7/1995 | Ohne | 310/323 |
| 5,633,554 | 5/1997 | Kaji | 310/328 |

FOREIGN PATENT DOCUMENTS

| | | |
|---|---|---|
| 0537446 | 4/1993 | European Pat. Off. . |
| 0580049 | 1/1994 | European Pat. Off. . |
| 0602648A1 | 6/1994 | European Pat. Off. . |

*Primary Examiner*—Mark O. Budd
*Attorney, Agent, or Firm*—Fitzpatrick, Cella, Harper & Scinto

[57] ABSTRACT

A vibration wave driving apparatus relatively moves a contact member and a vibration member by a vibration generated in the vibration member. The vibration member has a plurality of projections for magnifying the vibration displacement. At least the projections are formed on the vibration member by a press work.

27 Claims, 7 Drawing Sheets

VIBRATION WAVE DRIVING APPARATUS AND A VIBRATION MEMBER, AND MANUFACTURING METHOD OF THE APPARATUS AND THE MEMBER

BACKGROUND OF THE INVENTION

1. Field of the Invention

The present invention relates to a vibrating member and a manufacturing method of the member, and a vibration wave driving apparatus having the vibration member and a manufacturing method of the apparatus.

2. Related Background Art

Conventionally, as a vibration member used in an ultrasonic motor as a vibration wave driving apparatus, a circular- or track-shaped vibration member is known. Also, as is known in, e.g., U.S. Pat. No. 4,831,305, a plurality of projections are formed on such vibration member to magnify the vibration displacement.

The plurality of projections are formed by a cutting or grinding work, that requires much time and cost.

As a method of attaining a cost reduction of an ultrasonic motor, the present inventors proposed a method of manufacturing an elastic member, which constitutes the vibration member, by a press work.

An elastic member of a conventional ultrasonic motor is manufactured by a cutting or forging work. However, since the elastic member is manufactured from a plate material in the press work, it is impossible to obtain a conventional shape.

FIG. 11 is a perspective view showing a rotor and a vibration member of a circular-shaped ultrasonic motor manufactured by a known cutting or forging work.

A vibration member 1' is constituted by adhering a piezoelectric ceramic 1a' to a metal elastic member 1b' and a bottom surface portion 1d'. A rotor 2' has a contact portion 2a'.

As can be seen from FIG. 11, this shape is not suitable for a press work attained by bending a thin plate. Therefore, a cutting or forging work is required, resulting in high work cost.

With the press work using a thin plate as an inexpensive work method, a portion with poor bending rigidity is formed since the member is manufactured from the thin plate, and may disturb a function of the vibration member of the ultrasonic motor.

SUMMARY OF THE INVENTION

One aspect of the invention is to provide a vibration member formed with a plurality of projections for magnifying the vibration displacement, and a manufacturing method which forms at least the projections by a press work.

Another aspect of the invention is to provide a manufacturing method of a vibration wave driving apparatus, which comprises a vibration member formed with a plurality of projections for magnifying a vibration displacement, and a contact member which contacts the vibration member and moves relative to the vibration member by a vibration, wherein at least the projections of the vibration member are formed by a press work.

DETAILED DESCRIPTION OF THE PREFERRED EMBODIMENTS

Figure 1:
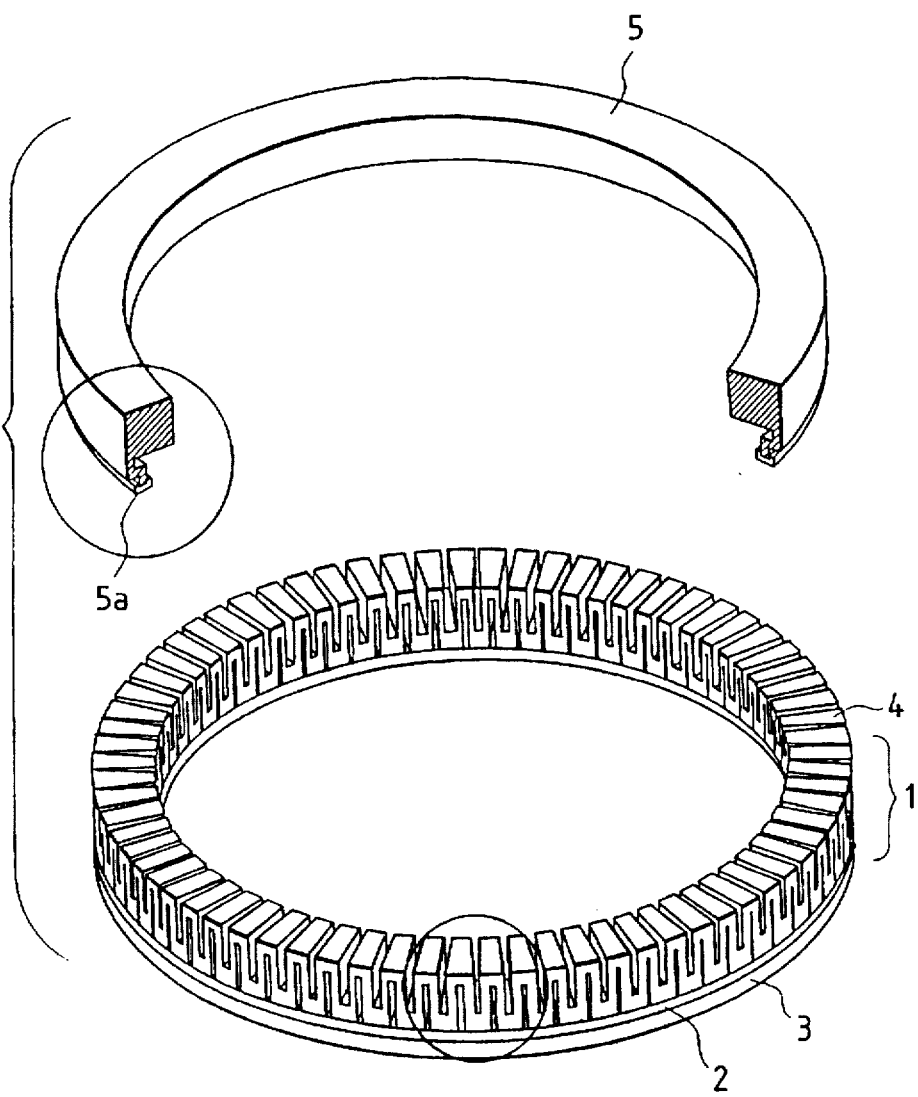
FIG. 1 is an exploded perspective view of an ultrasonic motor according to the first embodiment of the present invention.

FIG. 1 shows a circular-shaped ultrasonic motor as a vibration wave driving apparatus according to the first embodiment of the present invention. The ultrasonic motor is roughly classified into a vibration member 1 and a movable member 5 as a contact member. The vibration member 1 has a ring-shaped metal member 2, an electro-mechanical energy conversion element 3, and a friction member 4 having a plurality of projections, all of which are adhered to the member 2. The friction member 4 is manufactured by press-working an iron, iron alloy, or aluminum alloy thin plate so as to form a plurality of projections, as shown in FIG. 1.

Figure 3:
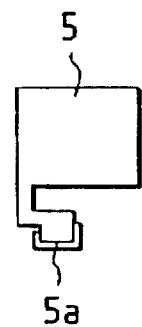
FIG. 3 is an enlarged sectional view of a movable member shown in FIG. 1.

On the other hand, the movable member 5 is constituted by fixing a friction member 5a to a main body portion, as shown in FIGS. 1 and 3.

Figure 2:
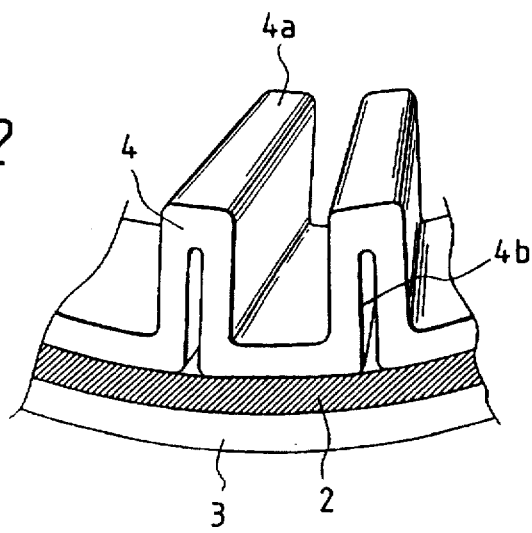
FIG. 2 is an enlarged perspective view of principal part of a vibration member shown in FIG. 1.

As shown in FIG. 2, a plurality of projections 4a and grooves 4b are formed by the press work on the friction member 4. The projections 4a are in direct frictional contact with the friction member 5a of the movable member, and the grooves 4b are located at substantially the central portions of the projections 4a. Therefore, the projections 4a can have an improved vibration displacement further magnifying effect due to the presence of the grooves 4b. In this embodiment, the friction member 4 is welded or adhered to the ring-shaped metal member as a base. Alternatively, the metal member 2 may be omitted, and the conversion element 3 may be directly adhered to the friction member 4.

It is preferable that a vibration acting on the friction member 5a be not easily transmitted to the movable member 5 itself. For this purpose, the movable member 5 preferably consists of a brass material with a relatively large specific gravity.

Figure 4A:
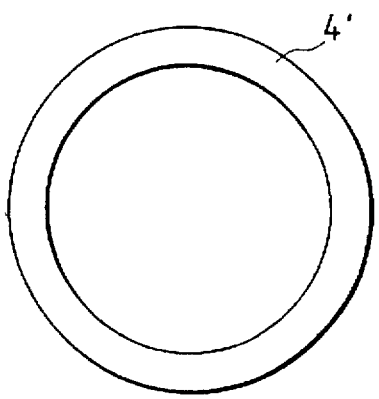
FIGS. 4A and 4B are explanatory views showing a friction member in the vibration member shown in FIG. 1 before and after a press work.
Figure 4B:
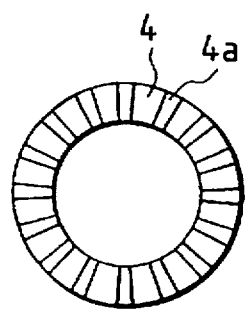

FIGS. 4A and 4B show a change in shape upon formation of the friction member 4 with the projections 4a of this embodiment by press-working a press blank member 4'.

Figure 5:
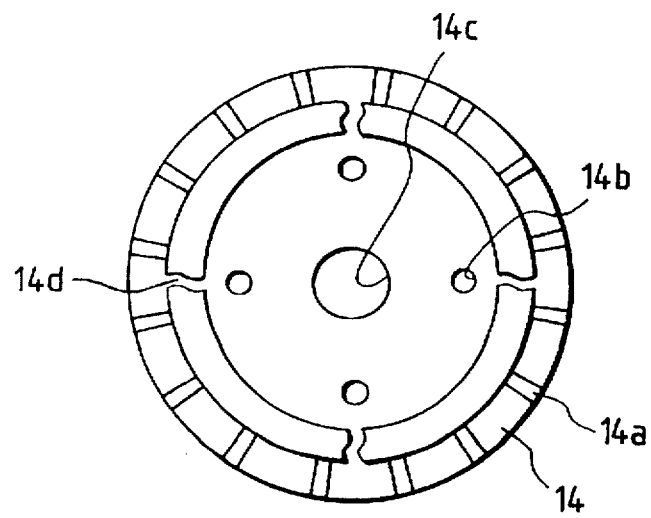
FIG. 5 is a plan view of a friction member of a vibration member according to the second embodiment of the present invention.

FIG. 5 shows a disk-shaped friction member 14 according to the second embodiment of the present invention. In the press work, a plurality of projections 14a, screw holes 14b to be coupled to an external system of vibration, a hole 14c which receives a motor shaft or through which the motor shaft passes, and a bridge portion 14d which is soft in terms of rigidity to insulate vibration are simultaneously formed.

Figure 6:
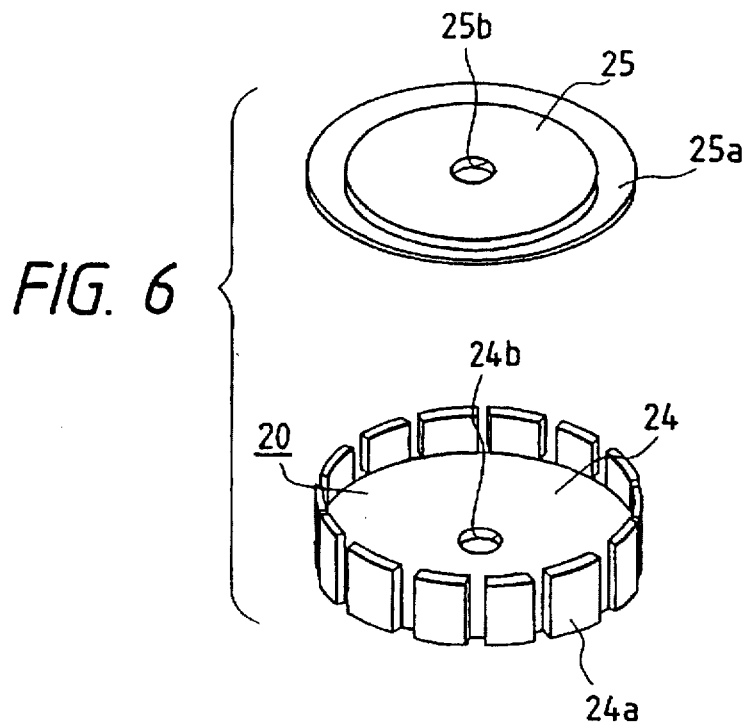
FIG. 6 is an exploded perspective view of an ultrasonic motor according to the third embodiment of the present invention.

FIG. 6 shows an ultrasonic motor according to the third embodiment of the present invention. A friction member 24 in a disk-shaped vibration member is formed with a plurality of projections 24a by bending a plate material in the axial direction using a press work. Note that a hole 24b for receiving a motor shaft is also formed by the press work.

Figure 7:
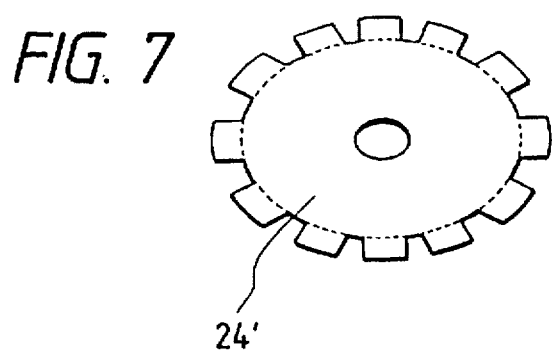
FIG. 7 is an explanatory view showing a friction member of a vibration member shown in FIG. 6 before a press work.

A movable member 25 has a friction member 25a fixed to its outer periphery and a hole 25b to be fitted on the motor shaft at its center. Note that FIG. 7 shows a blank plate member 24b before the press work, and the projections 24a are formed by bending portions indicated by dotted lines in FIG. 7 in the axial direction.

Figure 8:
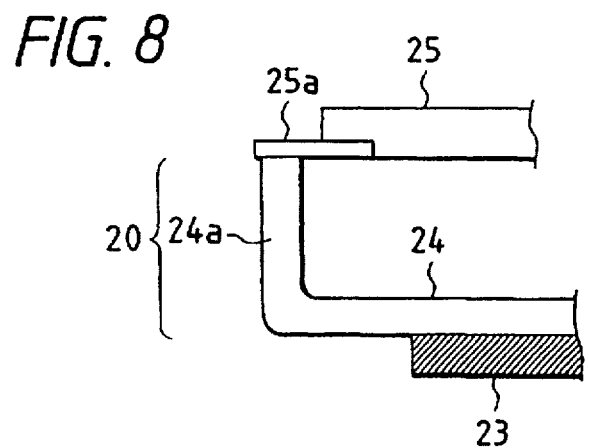
FIG. 8 is a sectional view showing a principal part of FIG. 6.

FIG. 8 is a sectional view of the ultrasonic motor shown in FIG. 6. Although not shown in FIG. 6, an electro-mechanical energy conversion element 23 is directly adhered to the lower surface of the friction member 24 to form a vibration member 20.

Since the projections 24a have low rigidity in the radial direction and high rigidity in the tangential direction, they are flexible in a direction required to serve as a contact spring, and also have a function of magnifying the displacement.

Since the friction member 25a of the movable member 25 is flexible in the axial direction and has a function of a contact spring, the vibration displacement of the projections 24a can be efficiently transmitted, thus improving driving efficiency.

In this embodiment, the outer diameter of the conversion element 23 is decreased.

In the above-mentioned embodiments, since a plurality of projections are formed on the vibration member by the press work, the manufacturing time and cost can be greatly reduced as compared to the conventional cutting or grinding work.

Since grooves are formed at substantially the central portions of the plurality of projections, the vibration displacement further magnifying effect can be improved.

Since the plurality of projections are formed by bending them in the radial direction, the vibration displacement can be further magnified.

Figure 9A:
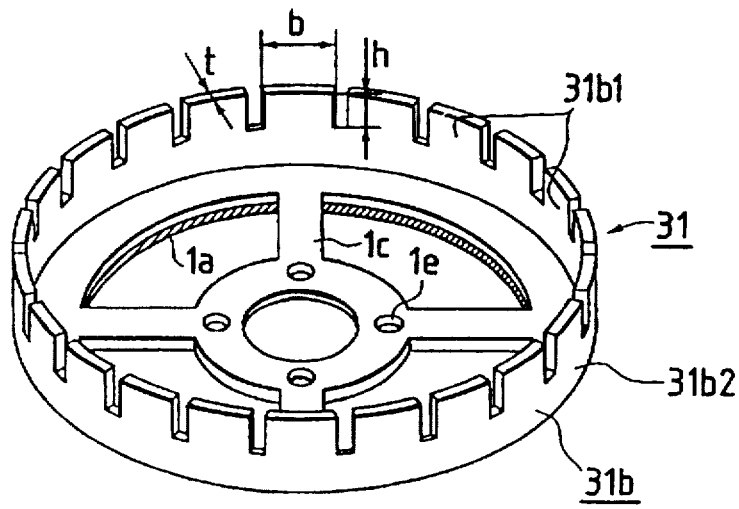
FIGS. 9A to 9C are views showing an ultrasonic motor according to the fourth embodiment of the present invention.
Figure 9B:
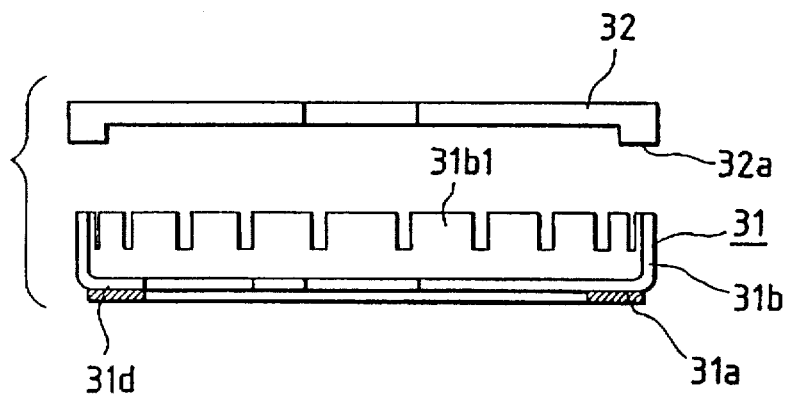
Figure 9C:
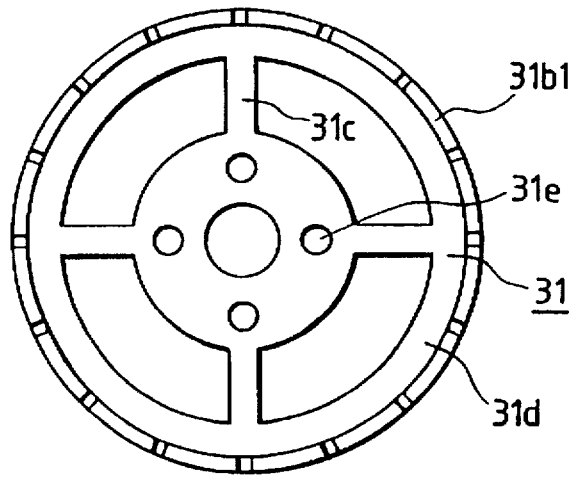

FIGS. 9A to 9C show the fourth embodiment. In this embodiment, a vibration member 31 is constituted by an elastic member 31b manufactured by press-working a metal thin plate, and a piezoelectric ceramic 31a serving as an electro-mechanical energy conversion element.

The elastic member 31b with the above structure is constituted as follows.

The elastic member 31b has a bent portion 31b2, which is bent by the press work upright from a bottom surface portion 31d adhered to the piezoelectric ceramic 31a, thereby compensating for decreases in static rigidity and dynamic rigidity as demerits of a circular-shaped elastic member using a thin plate.

The bent portion 31b2 is divided into a plurality of portions in the peripheral or circumferential direction to form a plurality of projections 31b1, thereby magnifying displacement components, in the peripheral direction, of a bending vibration.

In this case, it is important to appropriately set the width, b, and the height, h, of each projection 31b1 and the thickness, t, of the thin plate.

Originally, each projection 31b1 must have sufficiently high dynamic rigidity, and must sufficiently follow the frequency of travelling waves generated in the vibration member. When the elastic member is manufactured by the press work, the finished shape has higher precision as the plate is thinner. However, the use of the thin plate leads to a decrease in dynamic rigidity, in the direction of thickness, of the projection 31b1, i.e., a decrease in natural frequency of the bending vibration mode.

In view of this problem, in order to transmit a vibration to the contact member 32 using, as a driving force, a displacement, in the peripheral direction, at the distal ends of the projections 31b1 due to a bending vibration of the bottom surface portion 31d excited by expansion/contraction of the piezoelectric ceramic 31a generated upon application of an alternating voltage, the following conditions must be satisfied.

The rigidity of each projection 31b1 includes a rigidity component, in the moving direction, i.e., the peripheral direction, of the contact member 32, and a rigidity component in a direction perpendicular thereto, i.e., in the radial direction. The former rigidity is required to frictionally transmit the displacement component, in the peripheral direction, of a surface mass point at the distal end of each projection upon travel of the travelling waves. However, the latter rigidity, i.e., the rigidity in the radial direction does not contribute to the motor driving force. Rather, the projections preferably flex to eliminate slide motion in the radial direction.

Therefore, $b>t$ preferably holds to set the rigidity in the peripheral direction to be higher than that in the radial direction, as shown in FIGS. 9A to 9C. In the press work, the direction of thickness of this plate is set to agree with the radial direction of the elastic member.

As for the height h of the projection, the lowest-order natural frequency of a bending vibration mode in the peripheral direction is set to be higher than the driving frequency of the piezoelectric ceramic 31a so as to assure sufficient bending rigidity in the peripheral direction.

On the other hand, sufficient rigidity cannot be assured in the radial direction since the press plate has a small thickness. However, as described above, even when the natural frequency in this direction is lower than the driving frequency, it does not so deteriorate the motor performance.

Vibration member support portions 31c are formed integrally with the elastic member by the press work. In this case, the bending rigidity in the axial direction is decreased by punching four portions in the peripheral direction so as to eliminate vibration disturbance to travelling waves due to constraint and fixing of the vibration member by screw holes 31e. Note that the contact member 32 has a contact portion 32a, which contacts the projections 31b1.

Figure 10:
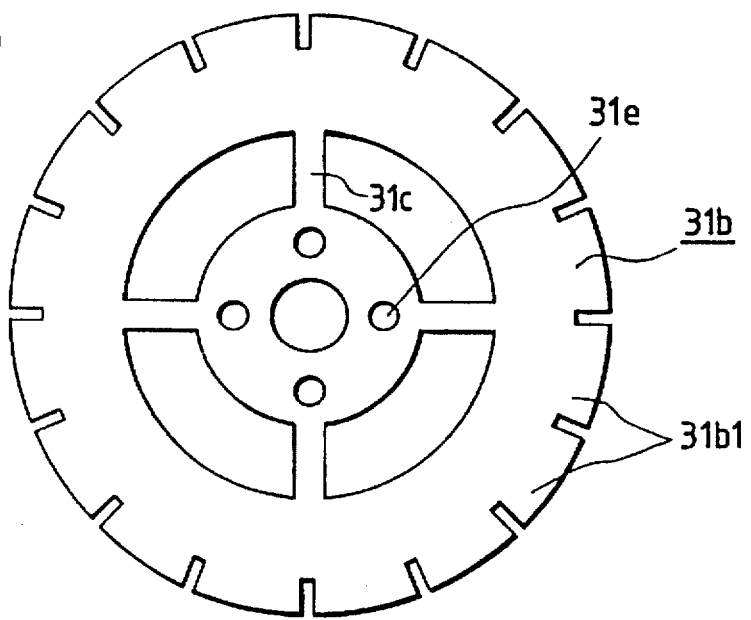
FIG. 10 is a view showing an elastic member before a press work.

FIG. 10 is an exploded view of the thin plate before it is bent by the press work.

In the fourth embodiment shown in FIGS. 9A to 10, when the vibration member 31 is fixed in position, the contact member 32 moves; when the contact member 32 is fixed in position, the vibration member 31 moves.

Figure 12:
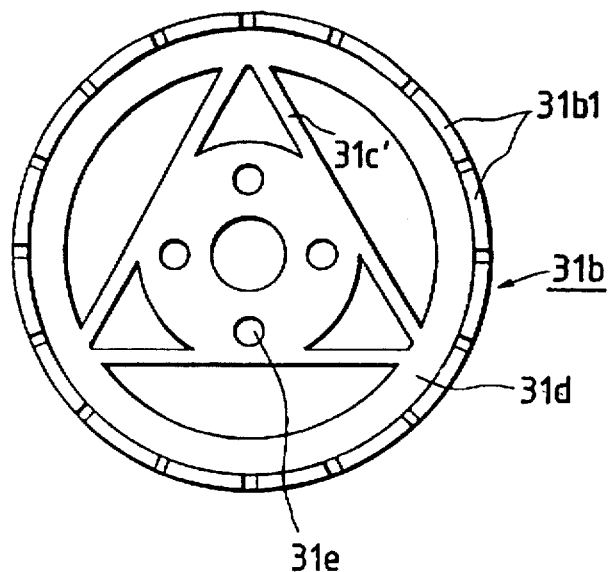
FIG. 12 is a plan view showing a vibration member according to the fifth embodiment of the present invention.

FIG. 12 shows the fifth embodiment of the present invention. In this embodiment, only a support structure is different from the fourth embodiment. That is, the vibration member support portions 31c are joined to the bottom surface portion 31d at six positions. With this arrangement, the bending rigidity can be increased in the peripheral direction while maintaining low bending rigidity in the axial direction, that determines the above-mentioned vibration disturbance.

The reason why the bending rigidity is increased in the peripheral direction is to eliminate changes in behavior of the vibration member upon application of a load torque to the contact member 32 as a movable member, and to improve the positioning precision of the contact member 32.

Figure 13:
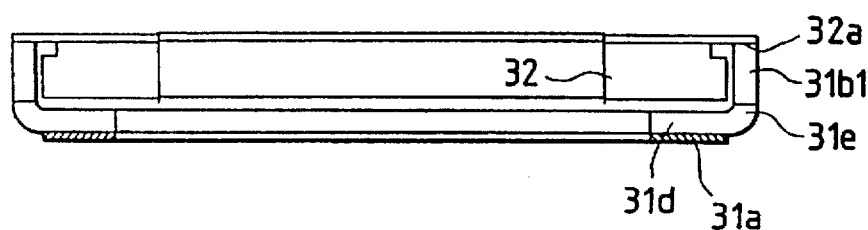
FIG. 13 is a sectional view of an ultrasonic motor according to a modification of the fourth embodiment of the present invention.

FIG. 13 shows a combination of the elastic member shown in FIGS. 9A to 9C and another contact member. The contact portion 32a serves as a spring, and is joined to the contact member 32. Note that the contact portion 32a is flexible in only the axial direction, but does not contribute to flexibility in the radial direction unlike in the conventional structure shown in FIG. 11. As described above, since the projections 31b1 of the elastic member have flexibility in the radial direction, the deformation of the projections can prevent an unnecessary slide motion in the radial direction, which does not contribute to motor driving.

Figure 14:
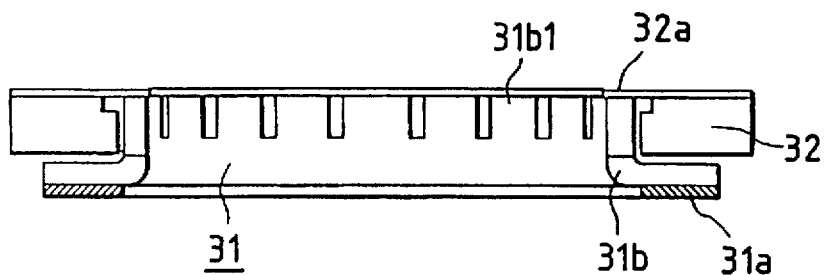
FIG. 14 is a sectional view of an ultrasonic motor according to the sixth embodiment of the present invention.

FIG. 14 shows the sixth embodiment of the present invention. The projections of the elastic member 31b of the vibration member 31 are arranged on the inner peripheral side as compared to the embodiment shown in FIGS. 9A to 9C. This structure is convenient for rotation detection since a rotary member, i.e., the contact member 32 is exposed to the outer circumferential surface.

Figure 15:
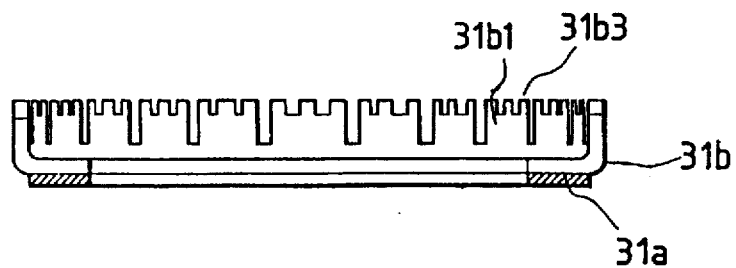
FIG. 15 is a sectional view showing a vibration member according to the seventh embodiment of the present invention.

FIG. 15 shows the seventh embodiment of the present invention. In addition to the projections 31b1 for magnifying the vibration displacement in the peripheral direction, small projections 31b3 for preventing slide motion are formed. Since the effect of the small projections 31b2 is described in detail in U.S. Appln. Ser. No. 167,144 and European publication No. 602,648, a detailed description thereof will be omitted. According to this embodiment, a vibration member with such shape can be manufactured with low cost.

Figure 16:
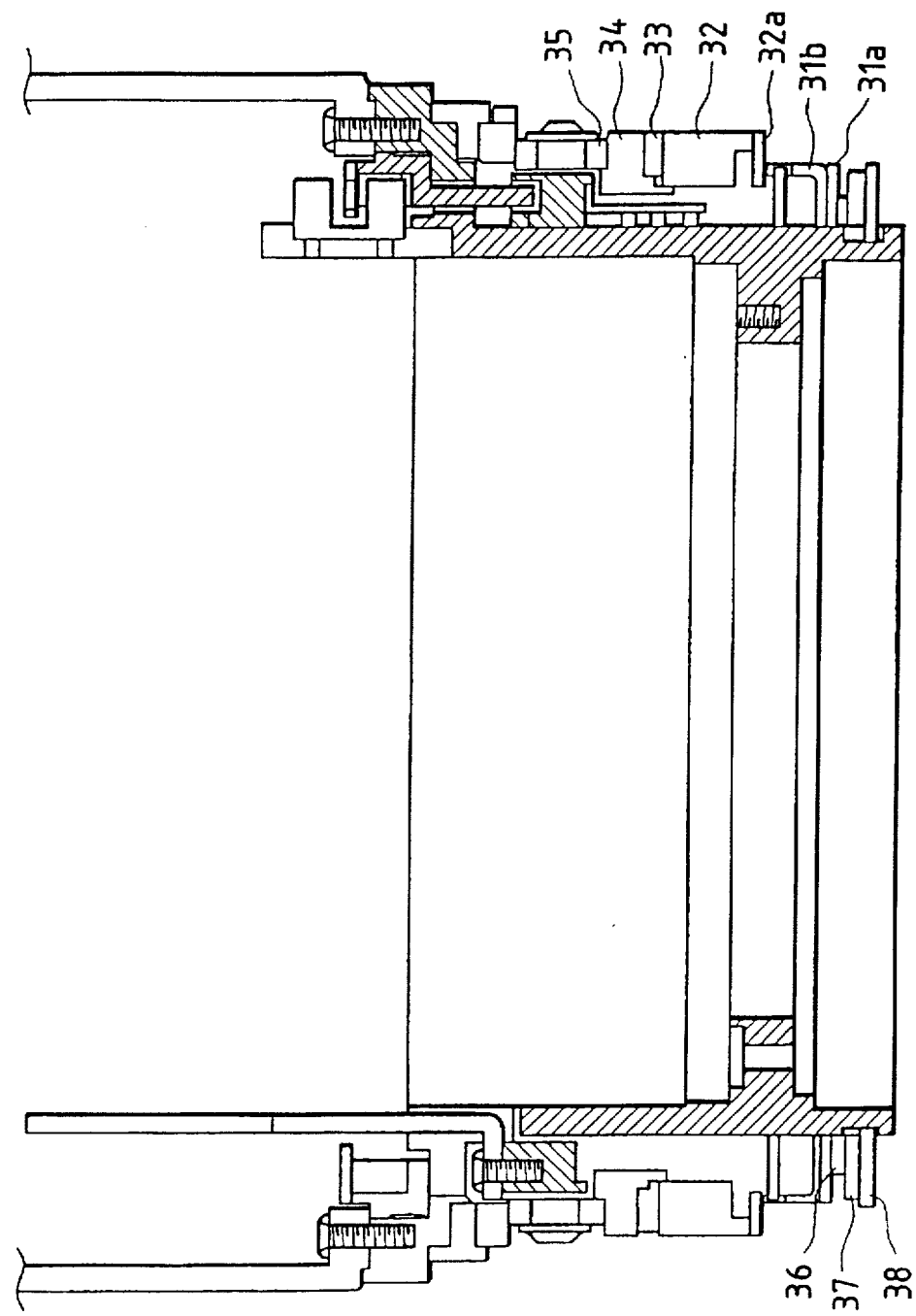
FIG. 16 is a sectional view showing an example in which a lens barrel is used as a vibration wave driven device.

FIG. 16 is a sectional view of a lens barrel as an example of a system driven by the ultrasonic motor of this embodiment. A rubber member 33 is used for controlling the vibration of the contact member 32 and transmitting the driving force to a metal ring 34. The translational motion of the shaft of rollers 35 drives a helicoid cylinder. A vibration absorbing member 36 has a function of insulating the vibration generated in the vibration member 31 from a metal ring 37. A washer 38 is used for determining position.

In the above embodiments, since the dynamic rigidity, in the relative moving direction, of the projections of the vibration member is set to be higher than that in a direction perpendicular thereto, the projections can follow the vibration generated in the vibration member, thus improving the motor performance (e.g., torque).

Also, since the lowest-order natural frequency of a bending vibration mode, in the relative moving direction, of the projections is set to be higher than that in a direction perpendicular thereto, sufficient dynamic rigidity can be assured in the relative moving direction, thus improving performance (e.g., torque).

Furthermore, since the lowest-order natural frequency of a bending vibration mode, in the relative moving direction, of the projections is set to be higher than the driving frequency of the electro-mechanical energy conversion element, and the lowest-order natural frequency of a bending vibration mode in a direction perpendicular thereto is set to be lower than the driving frequency of the conversion element, sufficient dynamic rigidity can be assured in the relative moving direction, thus improving the motor performance (e.g., torque).

Moreover, since the spring rigidity, in a direction perpendicular to the relative moving direction, of the contact portion of the contact member is set to be higher than the bending rigidity, in the direction of the projections, unnecessary slide motion in this direction can be eliminated, thus improving the motor performance (e.g., torque).

What is claimed is:

1. A vibration member for a vibration wave driven apparatus in which a contact member in contact with said vibration member is moved relative to said vibration member by a vibration generated in said vibration member, said vibration member having a closed-loop shape including a curved portion, and comprising:

a sheet member having a bent portion that defines a contact portion of said vibration member, said contact portion including a plurality of projections sequentially disposed in a direction of vibration propagation in the vibration member.

2. A vibration member according to claim 1, wherein said plurality of projections define a respective plurality of grooves therebetween.

3. A vibration member according to claim 1, wherein said bent portion of said sheet member is defined by said plurality of projections, each of said plurality of projections being individually bent in an axial direction of said sheet member.

4. A vibration member according to claim 1, wherein a bending rigidity of said plurality of projections in a direction of relative movement between said vibration member and a contact member is higher than a bending rigidity of said plurality of projections in a direction perpendicular to the direction of relative movement.

5. A vibration member according to claim 3, wherein a bending rigidity of said plurality of projections in a direction of relative movement between said vibration member and a contact member is higher than a bending rigidity of said plurality of projections in a direction perpendicular to the direction of relative movement.

6. A vibration member according to claim 1, wherein a lowest-order natural frequency of a bending vibration mode of said plurality of projections in a direction of relative movement between said vibration member and a contact member is higher than a lowest-order natural frequency of a bending vibration mode of said plurality of projections in a direction perpendicular to the direction of relative movement.

7. A vibration member according to claim 3, wherein a lowest-order natural frequency of a bending vibration mode of said plurality of projections in a direction of relative movement between said vibration member and a contact member is higher than a lowest-order natural frequency of a bending vibration mode of said plurality of projections in a direction perpendicular to the direction of relative movement.

8. A vibration member according to claim 5, further comprising an electro-mechanical energy conversion element functionally connected to said vibration member to vibrate said vibration member.

9. A vibration member according to claim 8, wherein a lowest-order natural frequency of a bending vibration mode of said plurality of projections in the direction of relative movement is higher than a driving frequency of said energy conversion element, and a lowest-order natural frequency of a bending vibration mode in a direction perpendicular to the direction of relative movement is lower than the driving frequency of said energy conversion element.

10. A vibration wave driven apparatus in which a contact member and a vibration member are moved relative to each other by vibration generated in the vibration member, said apparatus comprising:

a vibration member having a closed-loop share including a curved portion, said vibration member including a sheet member having a bent portion that defines a contact portion, said contact portion including a plurality of projections sequentially disposed in a direction of vibration propagation in said vibration member.

11. An apparatus according to claim 10, wherein said plurality of projections define a respective plurality of grooves therebetween.

12. An apparatus according to claim 10, wherein said bent portion of said sheet member is defined by said plurality of projections, each of said plurality of projections being individually bent in an axial direction of said sheet member.

13. An apparatus according to claim 10, wherein a bending rigidity of said plurality of projections in a direction of relative movement between said vibration member and a contact member is higher than a bending rigidity of said plurality of projections in a direction perpendicular to the direction of relative movement.

14. An apparatus according to claim 12, wherein a bending rigidity of said plurality of projections in a direction of relative movement between said vibration member and a contact member is higher than a bending rigidity of said plurality of projections in a direction perpendicular to the direction of relative movement.

15. An apparatus according to claim 10, wherein a lowest-order natural frequency of a bending vibration mode of said plurality of projections in a direction of said relative movement between said vibration member and a contact member is higher than a lowest-order natural frequency of a bending vibration mode of said plurality of projections in a direction perpendicular to the direction of relative movement.

16. An apparatus according to claim 12, wherein a lowest-order natural frequency of a bending vibration mode of said plurality of projections in a direction of relative movement between said vibration member and a contact member is higher than a lowest-order natural frequency of a bending vibration mode of said plurality of projections in a direction perpendicular to the direction of relative movement.

17. An apparatus according to claim 10, further comprising an electro-mechanical energy conversion element functionally connected to said vibration member to vibrate said vibration member.

18. An apparatus according to claim 16, wherein a lowest-order natural frequency of a bending vibration mode of said plurality of projections in the direction of relative movement is higher than a driving frequency of said energy conversion element, and a lowest-order natural frequency of a bending vibration mode of said plurality of projections in a direction perpendicular to the direction of relative movement is lower than the driving frequency of said energy conversion element.

19. A vibration driven system comprising:

a vibration wave driven apparatus in which a contact member and a vibration member are moved relative to each other by vibration generated in said vibration member, said apparatus comprising a vibration member including a sheet member having a bent portion that defines a contact portion, said contact portion including a plurality of projections sequentially disposed in a direction of vibration propagation in said vibration member.

20. A vibration driven system, comprising:

a vibration wave driven apparatus in which a contact member and a vibration member are moved relative to each other by vibration generated in said vibration member, said apparatus comprising a vibration member including a sheet member having a bent portion that defines a contact portion, said contact portion including a plurality of projections sequentially disposed in a direction of vibration propagation in said vibration member;

wherein a bending rigidity of said plurality of projections in a direction of relative movement between said vibration member and a contact member is higher than a bending rigidity of said plurality of projections in a direction perpendicular to the direction of relative movement.

21. A vibration member for a vibration driven motor, comprising:

a base portion; and a contact portion comprising a continuous sheet member having a plurality of folds formed therein in a direction transverse to a direction of vibration propagation in the vibration member, said contact portion being fixed to said base portion.

22. A vibration member according to claim 21, wherein said contact portion includes a plurality of press worked projections and a respective plurality of grooves formed therebetween.

23. A vibration member according to claim 21, wherein said vibration member has a closed loop shape having a curved portion.

24. A vibration member according to claim 21, wherein a bending rigidity of said plurality of projections in a direction of relative movement between said vibration member and a contact member is higher than a bending rigidity of said plurality of projections in a direction perpendicular to the direction of relative movement.

25. A vibration member according to claim 21, wherein a lowest-order natural frequency of a bending vibration mode of said plurality of projections in a direction of relative movement between said vibration member and a contact member is higher than a lowest-order natural frequency of a bending vibration mode of said plurality of projections in a direction perpendicular to the direction of relative movement.

26. A vibration member according to claim 21, further comprising an electromechanical energy conversion element functionally connected to said vibration member to vibrate said vibration member.

27. A vibration member according to claim 26, wherein a lowest-order natural frequency of a bending vibration mode of said plurality of projections in the direction of relative movement is higher than a driving frequency of said energy conversion element, and a lowest-order natural frequency of a bending vibration mode in a direction perpendicular to the direction of relative movement is lower than the driving frequency of said energy conversion element.

* * * * *

UNITED STATES PATENT AND TRADEMARK OFFICE
CERTIFICATE OF CORRECTION

PATENT NO. : 5,949,178

DATED : September 7, 1999

INVENTOR(S): JUN TAMAI, ET AL.

It is certified that error appears in the above-identified patent and that said Letters Patent is hereby corrected as shown below:

Column 1

Line 34, "work." should read --work; Fig. 11A is an enlarged view of a cut-away portion of Fig. 11.--.

Column 2

Figure 11:
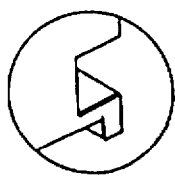
FIG. 11 is a perspective view showing a conventional ultrasonic motor.
Figure 11A:
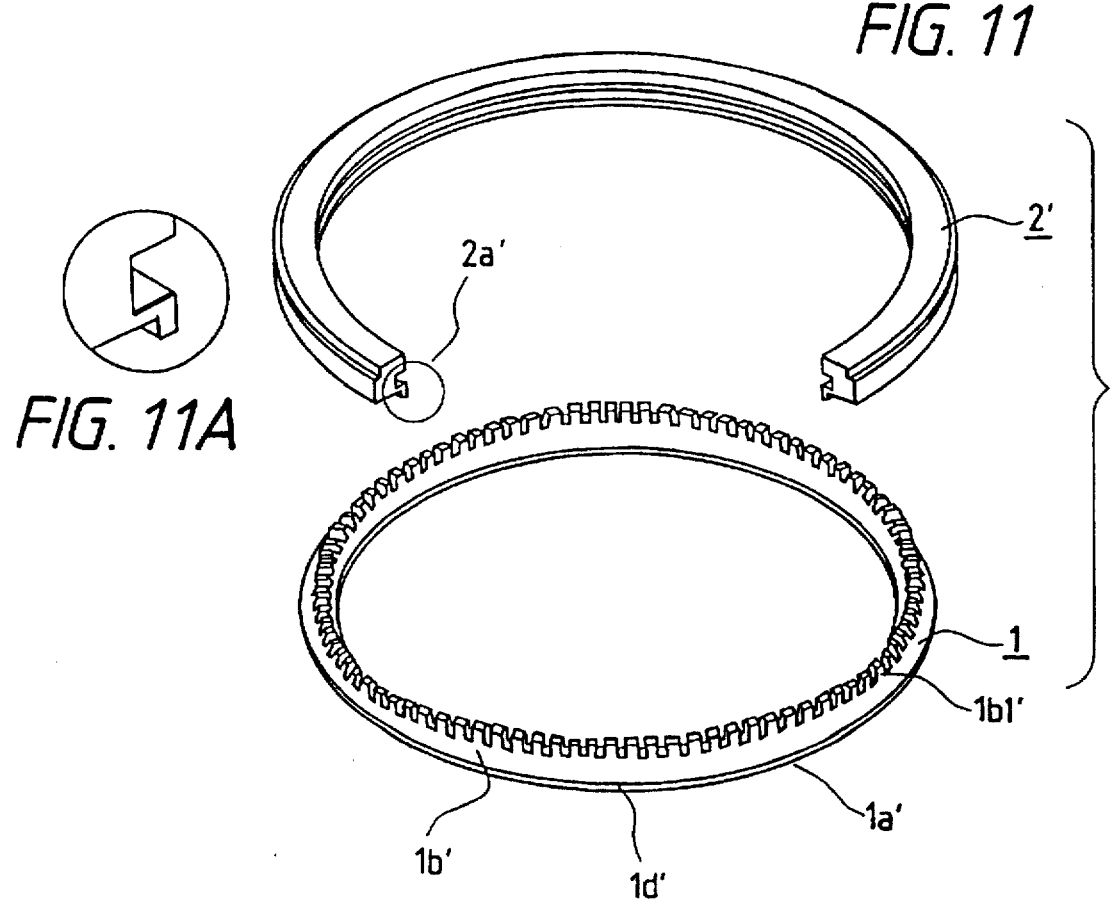

Line 24, "motor;" should read --motor, and Fig. 11A is an enlarged view of a cut-away portion of Fig. 11;--.

Column 5

Line 39, "31b2" should read --31b3--.

UNITED STATES PATENT AND TRADEMARK OFFICE
CERTIFICATE OF CORRECTION

PATENT NO. : 5,949,178

DATED : September 7, 1999

INVENTOR(S): JUN TAMAI, ET AL.

It is certified that error appears in the above-identified patent and that said Letters Patent is hereby corrected as shown below:

<u>Column 7</u>

Line 11, "share" should read --shape--.
    Line 54, "claim 16," should read --claim 17,--.

<u>Column 8</u>

Line 54, "electromechanical" should read
--electro-mechanical--.

Signed and Sealed this

Twentieth Day of June, 2000

Attest:

Q. TODD DICKINSON

*Attesting Officer*     *Director of Patents and Trademarks*